US009502968B2

(12) United States Patent
Giuliano et al.

(10) Patent No.: US 9,502,968 B2
(45) Date of Patent: Nov. 22, 2016

(54) SWITCHED-CAPACITOR CONVERTERS WITH LOW-VOLTAGE GATE DRIVERS

(71) Applicant: Arctic Sand Technologies, Inc., Burlington, MA (US)

(72) Inventors: David Giuliano, Brookline, MA (US); Gregory Szczeszynski, Hollis, NH (US); Raymond Barrett, Jr., Merrimack, NH (US)

(73) Assignee: ARCTIC SAND TECHNOLOGIES, INC., Burlington, MA (US)

( * ) Notice: Subject to any disclaimer, the term of this patent is extended or adjusted under 35 U.S.C. 154(b) by 0 days.

(21) Appl. No.: 14/276,426

(22) Filed: May 13, 2014

(65) Prior Publication Data

US 2014/0327479 A1    Nov. 6, 2014

Related U.S. Application Data

(63) Continuation of application No. 13/837,796, filed on Mar. 15, 2013, now Pat. No. 8,724,353.

(51) Int. Cl.
*H02M 3/07* (2006.01)

(52) U.S. Cl.
CPC ............. *H02M 3/07* (2013.01); *H02M 3/073* (2013.01)

(58) Field of Classification Search
CPC ........................ H02M 3/07; H02M 3/073
USPC ............... 363/59, 60; 327/536; 257/299
See application file for complete search history.

(56) References Cited

U.S. PATENT DOCUMENTS

| 4,214,174 A | 7/1980 | Dickson |
| 4,812,961 A | 3/1989 | Essaff et al. |
| 5,132,606 A | 7/1992 | Herbert |

(Continued)

FOREIGN PATENT DOCUMENTS

| JP | 10327573 | 12/1998 |
| JP | 11235053 | 8/1999 |

(Continued)

OTHER PUBLICATIONS

O. Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.

(Continued)

*Primary Examiner* — LaKaisha Jackson
(74) *Attorney, Agent, or Firm* — Occhiuti & Rohlicek LLP (57) ABSTRACT

An apparatus for converting voltage includes terminals coupled to external circuits at corresponding voltages and a switching network having driving circuits and semiconductor switches that interconnect capacitors in successive states to one another and to the terminals. The switches interconnect some capacitors to one another through a series of switches when an activation pattern causes them to be activated. Each driving circuit has power connections, a control input, and a drive output coupled to and controlling at least one switch. A drive output of one of them couples to and drives each switch. Some of the driving circuits are powered via corresponding power connections from at least one of the capacitors such that a voltage across the corresponding power connections is less than a highest of the corresponding voltages. The terminals and the switching network are constituents of a switched capacitor converter.

33 Claims, 10 Drawing Sheets

(56) References Cited

U.S. PATENT DOCUMENTS

| | | | |
|---|---|---|---|
| 5,301,097 A | 4/1994 | McDaniel | |
| 5,737,201 A | 4/1998 | Meynard et al. | |
| 5,761,058 A | 6/1998 | Kanda et al. | |
| 5,801,987 A | 9/1998 | Dinh | |
| 5,907,484 A | 5/1999 | Kowshik et al. | |
| 5,978,283 A | 11/1999 | Hsu et al. | |
| 6,107,864 A | 8/2000 | Fukushima et al. | |
| 6,476,666 B1 | 11/2002 | Palusa et al. | |
| 6,486,728 B2 | 11/2002 | Kleveland | |
| 6,501,325 B1 | 12/2002 | Meng | |
| 6,504,422 B1 | 1/2003 | Rader et al. | |
| 6,759,766 B2 | 7/2004 | Hiratsuka et al. | |
| 6,927,441 B2 | 8/2005 | Pappalardo et al. | |
| 6,980,181 B2 | 12/2005 | Sudo | |
| 7,145,382 B2 | 12/2006 | Ker et al. | |
| 7,190,210 B2 | 3/2007 | Azrai et al. | |
| 7,224,062 B2 | 5/2007 | Hsu | |
| 7,239,194 B2 | 7/2007 | Azrai et al. | |
| 7,250,810 B1 | 7/2007 | Tsen | |
| 7,408,330 B2 | 8/2008 | Zhao | |
| 7,511,978 B2 | 3/2009 | Chen et al. | |
| 7,595,682 B2 | 9/2009 | Lin et al. | |
| 7,595,683 B1 * | 9/2009 | Floyd | H02M 3/073 327/536 |
| 7,724,551 B2 | 5/2010 | Yanagida et al. | |
| 7,777,459 B2 | 8/2010 | Williams | |
| 7,782,027 B2 | 8/2010 | Williams | |
| 7,786,712 B2 | 8/2010 | Williams | |
| 7,807,499 B2 | 10/2010 | Nishizawa | |
| 7,812,579 B2 | 10/2010 | Williams | |
| 7,928,705 B2 | 4/2011 | Hooijschuur et al. | |
| 7,999,601 B2 | 8/2011 | Schlueter et al. | |
| 8,018,216 B2 | 9/2011 | Kakehi | |
| 8,040,174 B2 | 10/2011 | Likhterov | |
| 8,048,766 B2 | 11/2011 | Joly et al. | |
| 8,111,054 B2 | 2/2012 | Yen et al. | |
| 8,159,091 B2 | 4/2012 | Yeates | |
| 8,193,604 B2 | 6/2012 | Lin et al. | |
| 8,212,541 B2 | 7/2012 | Perreault et al. | |
| 8,339,184 B2 * | 12/2012 | Kok | H03K 17/687 327/536 |
| 8,350,549 B2 | 1/2013 | Kitabatake | |
| 8,384,467 B1 | 2/2013 | O'Keeffe et al. | |
| 8,395,914 B2 | 3/2013 | Klootwijk et al. | |
| 8,456,874 B2 | 6/2013 | Singer et al. | |
| 8,503,203 B1 | 8/2013 | Szczeszynski et al. | |
| 8,619,445 B1 * | 12/2013 | Low | H02M 1/32 363/59 |
| 8,817,501 B1 * | 8/2014 | Low | H02M 3/07 363/59 |
| 8,981,836 B2 * | 3/2015 | Kern | H03L 7/0895 327/536 |
| 2003/0169096 A1 | 9/2003 | Hsu et al. | |
| 2003/0227280 A1 | 12/2003 | Vinciarelli | |
| 2004/0041620 A1 | 3/2004 | D'Angelo et al. | |
| 2005/0007184 A1 | 1/2005 | Kamijo | |
| 2005/0207133 A1 | 9/2005 | Pavier et al. | |
| 2007/0210774 A1 | 9/2007 | Kimura et al. | |
| 2007/0230221 A1 | 10/2007 | Lim et al. | |
| 2008/0150621 A1 | 6/2008 | Lesso et al. | |
| 2008/0157732 A1 | 7/2008 | Williams | |
| 2008/0157733 A1 | 7/2008 | Williams | |
| 2008/0186081 A1 | 8/2008 | Yamahira et al. | |
| 2008/0239772 A1 | 10/2008 | Oraw et al. | |
| 2009/0072800 A1 * | 3/2009 | Ramadass | H02M 3/07 323/271 |
| 2009/0102439 A1 | 4/2009 | Williams | |
| 2009/0257211 A1 | 10/2009 | Kontani et al. | |
| 2009/0278520 A1 | 11/2009 | Perreault et al. | |
| 2010/0110741 A1 | 5/2010 | Lin et al. | |
| 2010/0140736 A1 | 6/2010 | Lin et al. | |
| 2010/0202161 A1 | 8/2010 | Sims et al. | |
| 2010/0214746 A1 | 8/2010 | Lotfi et al. | |
| 2010/0244189 A1 | 9/2010 | Klootwijk et al. | |
| 2010/0244585 A1 | 9/2010 | Tan et al. | |
| 2011/0101938 A1 | 5/2011 | Ma et al. | |
| 2011/0163414 A1 | 7/2011 | Lin et al. | |
| 2012/0146177 A1 | 6/2012 | Choi et al. | |
| 2012/0313602 A1 | 12/2012 | Perreault et al. | |
| 2012/0326684 A1 | 12/2012 | Perreault et al. | |
| 2013/0049714 A1 | 2/2013 | Chiu | |
| 2013/0094157 A1 | 4/2013 | Giuliano | |
| 2013/0154600 A1 | 6/2013 | Giuliano | |
| 2013/0229841 A1 | 9/2013 | Giuliano | |

FOREIGN PATENT DOCUMENTS

| | | |
|---|---|---|
| JP | 2003284324 | 10/2003 |
| JP | 2010045943 A | 2/2010 |
| KR | 10-2010-0138146 | 12/2010 |
| WO | 2006093600 | 9/2006 |
| WO | 2009112900 | 9/2009 |
| WO | 2011/089483 | 7/2011 |
| WO | 2012151466 | 11/2012 |
| WO | 2013059446 | 4/2013 |
| WO | 2013096416 | 6/2013 |

OTHER PUBLICATIONS

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Axelrod et al. "Single-switch single-stage switched-capacitor buck converter", *Proc. of NORPIE 2004, 4th Nordic Workshop on Power and Industrial Electronics*, Jun. 2004, entire document, pp. 1-5 of pdf submission.

Sun et al. "High Power Density, High Efficiency System Two-Stage Power Architecture for Laptop Computers", *Power Electronics Specialists Conference*, pp. 1-7, Jun. 2006.

R. D. Middlebrook, "Transformerless DC-to-DC Converters with Large Conversion Ratios" *IEEE Transactions on Power Electronics*, vol. 3, No. 4, pp. 484-488, Oct. 1988.

Wood et al, "Design, Fabrication and Initial Results of a 2g Autonomous Glider" *IEEE Industrial Electronics Society*, pp. 1870-1877, Nov. 2005.

T. A. Meynard, H. Foch, "Multi-Level Conversion: High Voltage Choppers and Voltage-Source Inverters," *IEEE Power Electronics Specialists Conference*, pp. 397-403, 1992.

Pilawa-Podgurski et al. "Merged Two-Stage Power Converter Architecture with Soft Charging Switched-Capacitor Energy Transfer" *39th IEEE Power Electronics Specialists Conference*, 2008, pp. 4008-4015.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

Lei et al. "Analysis of Switched-capacitor DC-DC Converters in Soft-charging Operation" *14th IEEE Workshop on Control and Modeling for Power Electronics*, pp. 1-7, Jun. 23, 2013.

Ng et al. "Switched Capacitor DC-DC Converter: Superior where the Buck Converter has Dominated" *PhD Thesis, UC Berkeley*, Aug. 17, 2011, entire document, pp. 1-141 of pdf submission.

R. Pilawa-Podgurski and D. Perreault, "Merged Two-Stage Power Converter with Soft Charging Switched-Capacitor Stage in 180 nm CMOS," *IEEE Journal of Solid-State Circuits*, vol. 47, No. 7, pp. 1557-1567, Jul. 2012.

* cited by examiner

SWITCHED-CAPACITOR CONVERTERS WITH LOW-VOLTAGE GATE DRIVERS

CROSS REFERENCE TO RELATED APPLICATION

This application is a continuation of U.S. application Ser. No. 13/837,796, filed on Mar. 15, 2013, the contents of which are hereby incorporated by reference in their entirety.

BACKGROUND

This invention relates to switched capacitor converters, and more particularly to efficient gate drivers for such converters.

A switch-mode power converter is a specific type of power converter that produces an output voltage by switching energy storage elements (i.e. inductors and capacitors) into different electrical configurations using a switch network. A switched capacitor power converter is a type of switch-mode power converter that primarily utilizes capacitors to transfer energy. In such converters, the number of capacitors and switches increases as the conversion gain increases.

As used herein, conversion gain represents a voltage gain if the switched capacitor power converter produces an output voltage that is larger than the input voltage or a current gain if the switched capacitor power converter produces an output voltage that is smaller than the input voltage.

Figure 1:
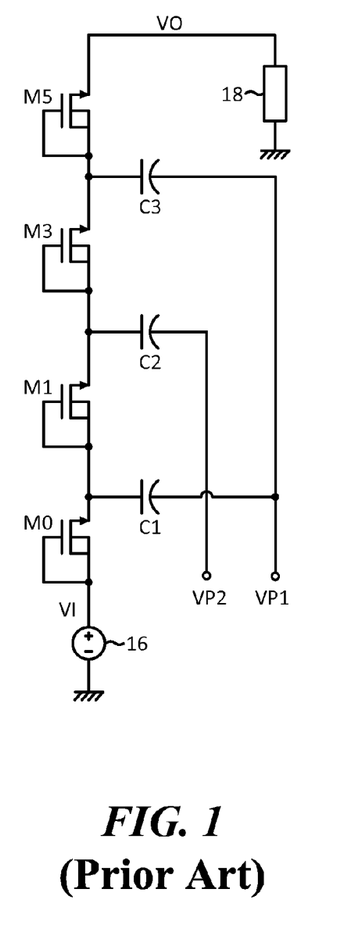
FIG. 1 is a schematic of a single-phase step-up cascade multiplier.
Figure 2:
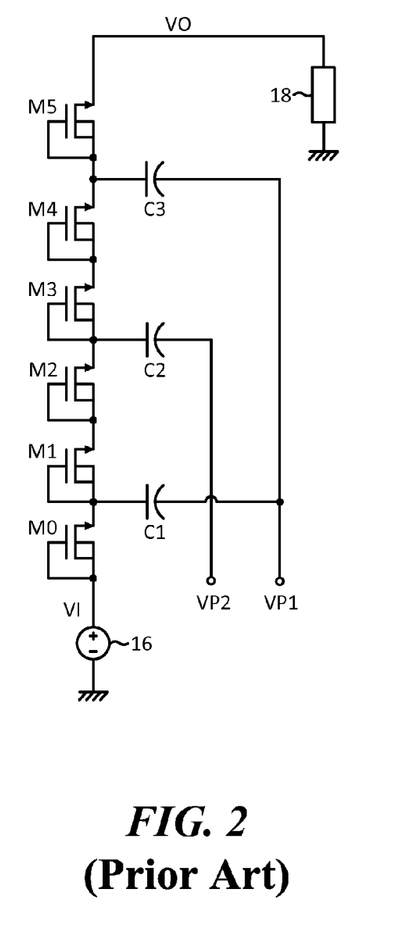
FIG. 2 is a schematic of a single-phase step-up cascade multiplier with cascoded switches.

FIGS. 1-2 show two examples of switched capacitor power converters that receive an input voltage VI from a voltage source 16 and provide an output voltage VO to a load 18. Both of the examples are also known as cascade multipliers. Note that in FIG. 2, a number of the switching devices of the circuit in FIG. 1 are replaced with series of multiple devices, thereby reducing the maximum voltage across individual devices in the circuit.

In normal operating, packets of charge are pumped along a chain of diode-connected NMOS transistors M0-M5 as pump capacitors C1-C3 are successively being charged and discharged. As shown in FIGS. 1-2, phase voltages VP1, VP2 are one hundred and eighty degrees out of phase. Each of the NMOS transistors M0-M5 is diode-connected, thereby only permitting boost operation (i.e. VO greater than VI). Additionally, the efficiency is severely impacted because a significant amount of voltage is dropped across each of the transistors M0-M5 during normal operation. Therefore, there is a desire to operate the NMOS transistors M0-M5 in their ohmic region, but due difficulty and/or complexity of driving the transistors M0-M5, a combination of both PMOS transistors and high-voltage transistors are typically used.

If the transistors in the switched capacitor power converter are integrated on a single substrate then it can be desirable to use as few different types of devices as possible. For a given semiconductor process, cost is related to the number of mask layers. As the number of different types of devices in a semiconductor process increases so does the number of mask layers and hence the cost.

Furthermore, it is well-known that electrons have a higher mobility than holes in silicon. Consequently, a NMOS device with a given on-resistance has a smaller gate capacitance than a PMOS device with the same on-resistance. It is also true that a NMOS device with a given gate capacitance has a smaller on-resistance than a PMOS device with the same gate capacitance. In a power converter, it is therefore desirable to replace as many PMOS devices in the main power path with NMOS devices and replace as many high-voltage devices with low-voltage devices.

SUMMARY

In one aspect, in general, a switched capacitor power converter has a first terminal for coupling to a first external circuit at substantially a high voltage (e.g., 20 v), and a second terminal for coupling to a second external circuit at substantially a low voltage (e.g., 5 v) less than the high voltage in magnitude. A first plurality of active semiconductor switch elements are configured to electrically interconnect capacitors to one another and/or to the first or second terminal, in successive states. The switch elements are configured to interconnect at least some capacitors to one another through a series of multiple of the switch elements. A plurality of switch driving circuits are coupled to and for control by a drive output of one of the switch driving circuits. Each driving circuit has a control input, power connections, and a drive output coupled to and for control of one or more of the switch elements. At least some switch driving circuits are configured to be powered via the power connections of said driving circuits from one or more of the capacitors such that the voltage across the power connections of said driving circuit is substantially less than the high voltage.

In another aspect, in general, a switched capacitor power converter has a first terminal for coupling to a first external circuit at substantially a high voltage and a second terminal for coupling to a second external circuit at substantially a low voltage less than the high voltage in magnitude. A plurality of active semiconductor switch elements is configured to electrically interconnect capacitors to one another and to the first or second terminal, in successive states. The switch elements and capacitors are configured to form multiple distinct charge transfer paths between the first terminal and the second terminal. A plurality of switch driving circuits are coupled to and for control by a drive output of one of the switch driving circuits, with each driving circuit having a control input, power connections, and a drive output coupled to and for control of one or more of the switch elements. At least some switch driving circuits are configured to be powered via the power connections of said driving circuits from one or more of the capacitors such that the voltage across the power connections of said driving circuit is substantially less than the high voltage. At least some of the switch driving circuits that control switch elements of one of the distinct charge transfer paths are powered from capacitors of one or more other charge transfer paths.

Aspects can include one or more of the following features.

The switched capacitor power converter further comprises a plurality of capacitors coupled to the first plurality of switch elements controllably coupled via the semiconductor switches, or comprises a plurality of terminals coupled to the first plurality of switch elements for connecting to the capacitors.

The converted is configured to provide time varying voltages relative to the low voltage to at least some of the driving circuits.

Each switch element has a maximum voltage rating less than the high voltage.

Each of the series of switch elements comprises N elements, N>1, and wherein the maximum voltage ratings of the switch elements is no greater than 2/N times the low voltage.

The voltage across the power connections of the driving circuit is configured to be driven from the capacitors with less than or substantially equal to two times the low voltage.

Each switch element in the series of multiple of the switch elements is driven by a corresponding driving circuit a plurality of switch driving circuits, each of said driving circuits are configured to be powered via the power connections of said driving circuits from different capacitors of the plurality of capacitors that in operation have different voltages.

The switch elements and capacitors are configured to form multiple distinct charge transfer paths between the first terminal and the second terminal, and wherein at least some of the switch driving circuits that control the switch elements of one of the distinct charge transfer paths are powered from the capacitors of one or more other charge transfer paths.

The switched capacitor power converter further comprises a phase generator comprising a second plurality of switch elements. The phase generator is configured to provide a time varying voltage level to one terminal of each of the plurality of the capacitors, and configured to generate a voltage level for at least one capacitor in one charge transfer path using a voltage from a capacitor in the other charge transfer path.

Advantages of one or more aspects may include the following.

Overall efficiency of the converter is increased by reducing the losses in generating the gate driving signals that repeatedly charge and discharge the gates of the transistors in the switched capacitor power converter.

Low-voltage transistors can be used by limiting the gate-to-source voltages.

Cascoded configurations can be efficiently driven with different transistors in a cascoded series being driven with different voltages.

In the case of a converter that makes use of external (e.g., discrete) capacitors, using those same capacitors to power internal gate driver circuits avoids the need to provide additional intermediate power terminals to the device.

An integrated circuit is typically limited by the number of pins it is allowed to have. Each pin consumes a certain amount of area on a silicon die and if the pin count is very large it is possible that the area consumed by the pins is larger than the area consumed by the active devices on the silicon die. Each capacitor will require at least one pin and in some cases require two pins. Using the voltages available on the capacitors used in the charge transfer path to power gate drivers is preferable to providing these voltages through additional pins on the device because the total pin count does not have to be increased.

Other features and advantages of the invention are apparent from the following description, and from the claims.

DESCRIPTION

1. Overview

A number of approaches are described below for use in the context of active control of switched capacitor power converters. The approaches address one or more of the following goals:

Increase in efficiency of the converter by reducing the charge deposited and discharged from the gates of control transistors Permitting use of low-voltage transistors for switching.

Generally, an approach to achieving these goals is by efficiently limiting the gate-to-source voltages though the design and powering of circuits driving the switching transistors during operation. A number of specific approaches, some of which are described below, use control circuitry for switching transistors, which couple the capacitors in the charge transfer path, that are themselves powered by capacitors in the same path, and/or by capacitors in different parallel paths in the case of multi-phase converters.

2. Single-Phase Cascade Multiplier

Figure 3:
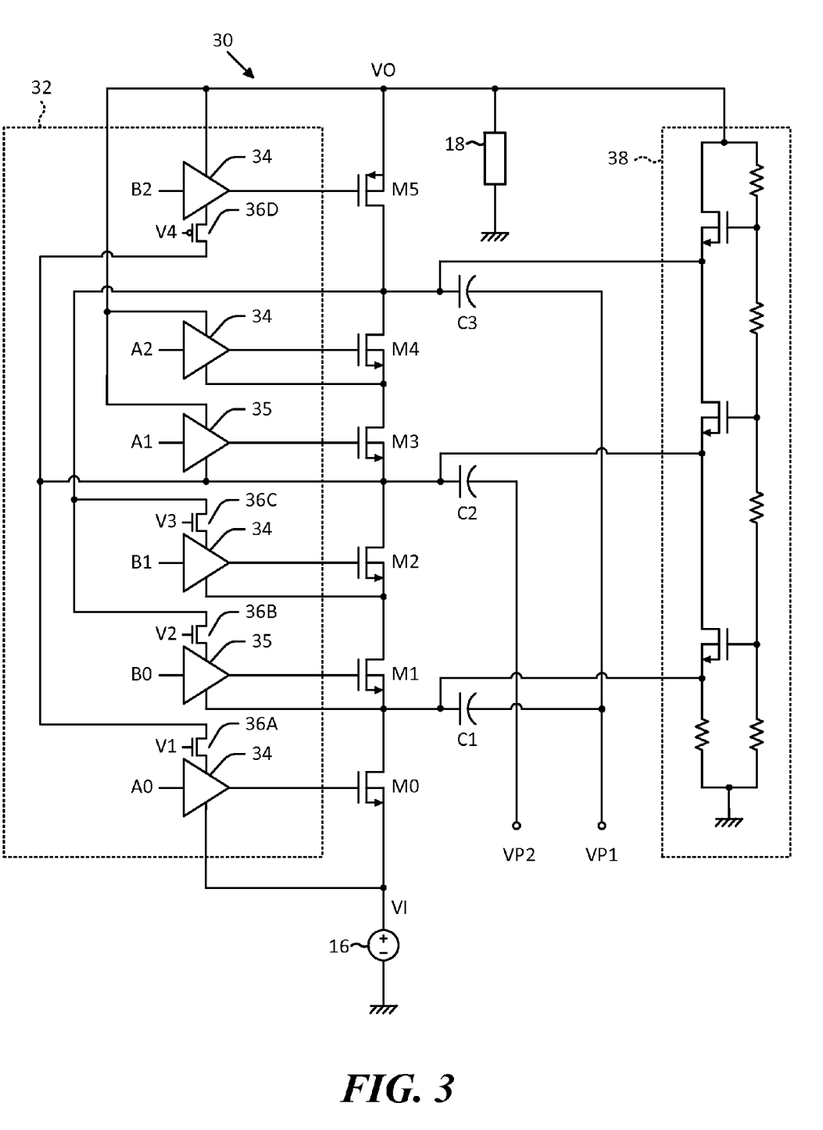
FIG. 3 is a schematic of a single-phase cascade multiplier with cascoded switches and corresponding gate drivers and pre-charging circuit.

Referring to FIG. 3, a single-phase cascade multiplier circuit 30 makes use of transistors M0-M5 coupling to first, second, and third pump capacitors C1-C3 on the charge transfer path between a high-voltage terminal (i.e. VO) and a low-voltage terminal (i.e. VI). In the embodiment illustrated in FIG. 3, the pump capacitors C1-C3 are coupled by cascoded transistor switches (e.g., M1 and M2 in series), but it should be understood that single transistors could also be used while still achieving at least some of the advantages of the configuration shown.

Each transistor is driven by a corresponding gate driver circuit. As described in more detail below, at least some of the gate driving circuits are powered from the pump capacitors C1-C3 in the charge transfer path between the high-voltage terminal and the low-voltage terminal. The voltage across each of the pump capacitors C1-C3 is a fraction of the high voltage, thereby permitting efficient generation of gate driving signals that maintain desired limits on the gate-to-source voltages of the transistors.

A driver set 32 provides the gate signals to activate or de-activate each transistor in the cascade multiplier circuit 30. The driver set 32 includes four low-voltage gate driver circuits 34, two high-voltage gate driver circuits 35, and four voltage followers 36A-36D. Each gate driver circuit receives a driver signal with a label either beginning with an "A" or a "B". The driver signals A0, B0, B1, A1, A2, B2 control transistors M0, M1, M2, M3, M4, M5, respectively. Furthermore, the voltage followers 36A-36D receive corresponding bias voltages V1-V4, respectively. A control circuit (not shown in FIG. 3) generates the driver signals A0-B2 and the bias voltages V1-V4.

The low-voltage gate driver circuits 34 are coupled to the transistors M0, M2, M4, M5, whereas, the high-voltage gate driver circuits 35 are coupled to the transistors M1, M3. The high-voltage gate driver circuits 35 support twice the supply voltage of the low-voltage gate driver circuits 34. Each of the voltage followers 36A-36D receive a voltage from one of the pump capacitors C1-C3 and provides a constant voltage to their corresponding gate driver circuit (i.e. 34 or 35) that is equal to or lower in value. When the received voltage is equal to the provided voltage, the corresponding voltage follower (e.g. 36A) behaves like a switch. To achieve this behavior, the bias voltages V1-V3 are at least a threshold voltage above the corresponding source voltage while the bias voltage V4 is at least a threshold voltage below the corresponding source voltage. Furthermore, the voltage followers 36A-36D experience the same voltage stress as the transistors M0-M5 in the cascade multiplier circuit 30.

Also illustrated in FIG. 3 is an example of a pre-charge circuit 38 that is used to initialize the voltages on the pump capacitors C1-C3 prior to clocked operation of the cascade multiplier circuit 30. By pre-charging the pump capacitors C1-C3, the drain-to-source voltages across the transistors M0-M5 within the cascade multiplier circuit 30 can be maintained within required limits during startup, and further, the pre-charged pump capacitors C1-C3 can provide the needed power to the gate driving circuits immediately upon the start of clocked operation of the cascade multiplier circuit 30. Upon clocked operation, the pre-charge circuit 38 can be disabled.

To facilitate the use of low-voltage transistors throughout the whole power converter, the pre-charge circuit 38 uses a combination of low-voltage transistors and bias resistors. A resistor divider sets up the pre-charge voltage for each of the pump capacitors C1-C3 during startup, wherein the source voltage of each transistor within the pre-charge circuit 38 is at least a threshold voltage below its corresponding gate voltage. As a result, none of the transistors within either the pre-charge circuit 38 or the cascade multiplier circuit 30 are exposed to voltage stresses that can damage the devices during startup or clocked operation.

Figure 4:
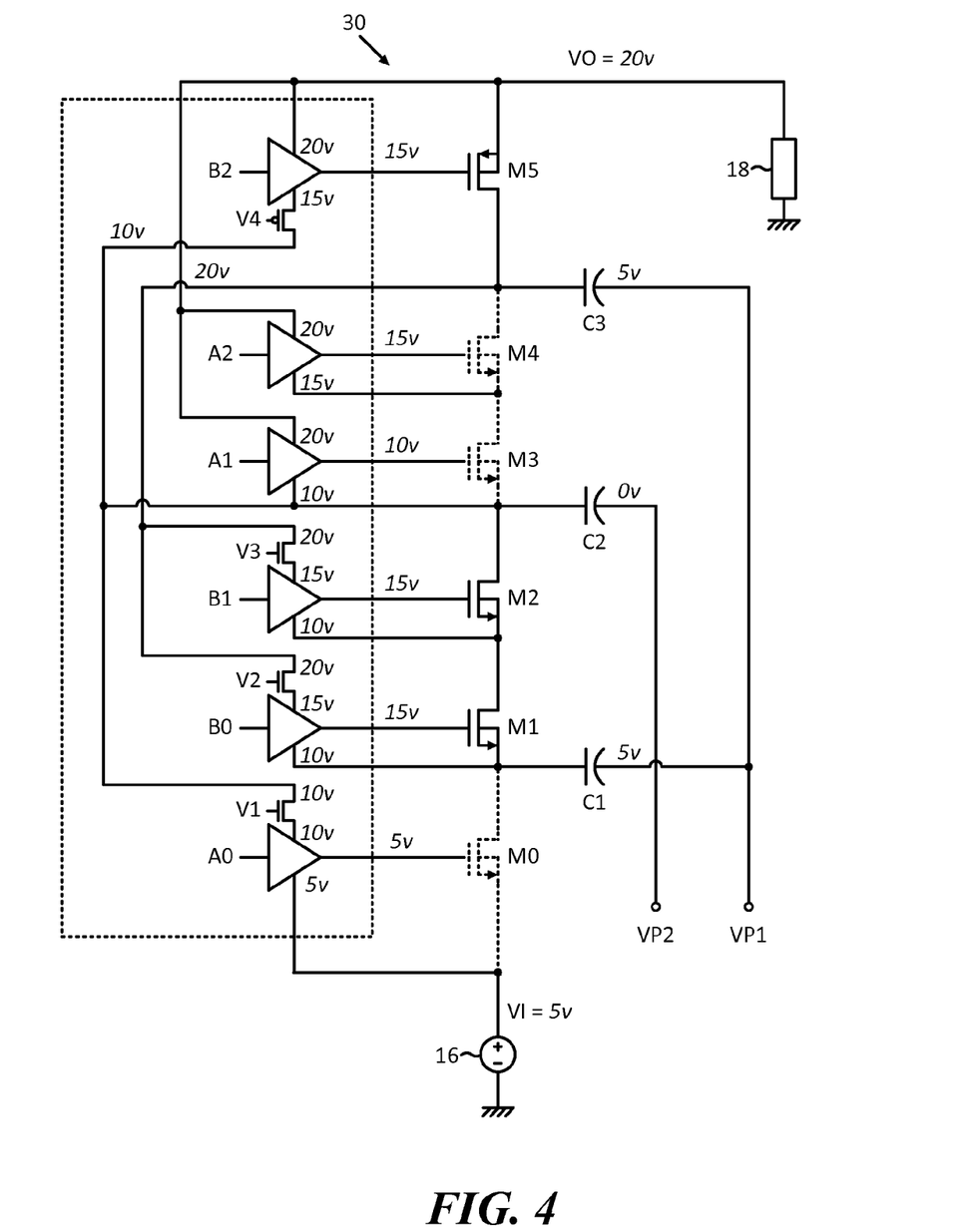
FIGS. 4-5 are annotated schematics of the circuit of FIG. 3 in two phases of operation, respectively.
Figure 5:
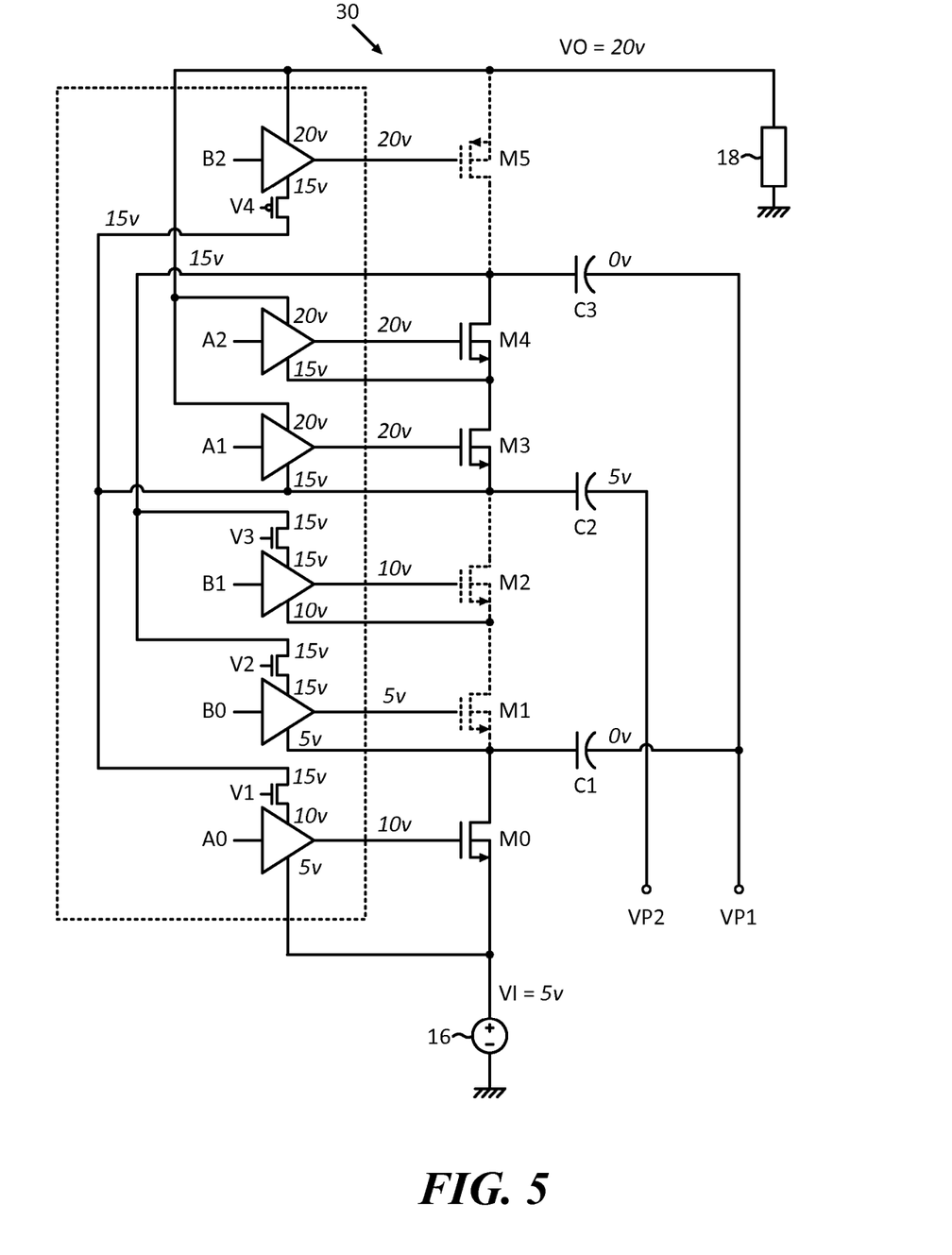

Operation of the cascade multiplier circuit 30 and the resulting voltage levels powering the gate driving circuits can be understood with reference to FIGS. 4-5 that show the two states of operation. The cascade multiplier circuit 30 transfers energy from a source 16 to a load 18 by cycling between a first state and a second state at a specific frequency. All of the transistors coupled with the "A" signals are activated and de-activated at the same time; as is the case for all of the transistors coupled with the "B" signals. To ensure a clean transition between the first and second state, the "A" signals and "B" signals are non-overlapping. Furthermore, first and second phase voltages VP1, VP2 are synchronized with the "A" signals and "B" signals.

Assuming an input voltage VI of five volts, then the cascade multiplier circuit 30 produces an output voltage VO that is twenty volts. The maximum voltage across any transistor is five volts. Furthermore, the low-voltage gate driver circuits 34 support five volts while the high-voltage gate driver circuits 35 must support ten volts.

FIG. 4 illustrates the first state, wherein the first phase voltage VP1 is at five volts while the second phase voltage VP2 is at zero volts. The gate driver circuits that receive a "B" signal activate their corresponding transistors and the gate driver circuits that receive an "A" signal de-activate their corresponding transistors. Consequently, a gate voltage of fifteen volts activates the transistors M1, M2, M5 while gate voltages of five volts, ten volts, and fifteen volts de-activate the transistors M0, M3, M4, respectively.

In contrast, FIG. 5 illustrates the second state, wherein the first phase voltage VP1 is at zero volts while the second phase voltage VP2 is at five volts. The gate driver circuits that receive an "A" signal activate their corresponding transistors and the gate driver circuits that receive a "B" signal de-activate their corresponding transistors. Consequently, gate voltages of five volts, ten volts, and twenty volts de-activate the transistors M1, M2, M5, respectively; while gate voltages of ten volts, twenty volts, and twenty volts activate the transistors M0, M3, M4, respectively.

Unfortunately, the voltage followers 36A-36D associated with the transistors M0, M1, M2, M5 consume power. Each voltage follower drops five volts across its drain and source terminals while sinking or source current for its corresponding gate driver. In the case of the transistors M1, M2, M5, this occurs during the first state while for transistor M0 this occurs during the second state.

In the cascade multiplier circuit 30, charge transfers to the load 18 from the source 16 at a rate dictated by the load 18. Because this is a single-phase design, there is only one charge transfer path that a unit of charge can follow. For example, at the start of a first clock cycle, the unit of charge leaves the source 16 and flows into the first pump capacitor C1. After a state transition, the unit of charge moves to the second pump capacitor C2. When a second clock cycle begins, the unit of charge then moves from the second pump capacitor C2 to the third pump capacitor C3 and after one more state transition, the unit of charge finally reaches the load 18. It took two full clock cycles (i.e. four consecutive states) for the initial charge to reach the load 18 from the source 16.

In general, as the conversion gain of a cascade multiplier increases, the number of pump capacitors increases. Consequently, it takes a longer time for a unit of charge from the source 16 to reach the load 18 because the unit of charge needs to bounce between more pump capacitors. The number of clock cycles in the charge transfer path is M−2, where M is equal to the conversion gain. In this example, M is equal to four; therefore, the number of clock cycles is two.

Figure 6:
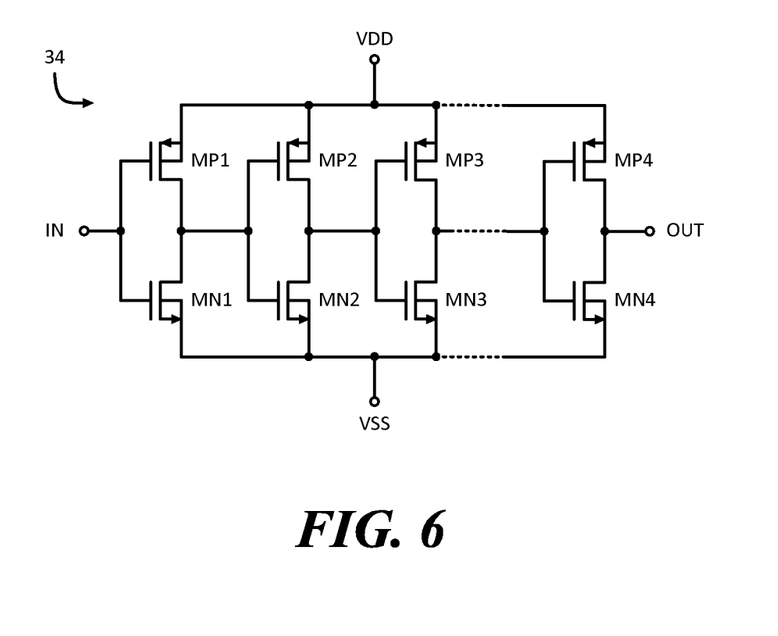
FIG. 6 is a schematic of a tapered gate driver.
Figure 7:
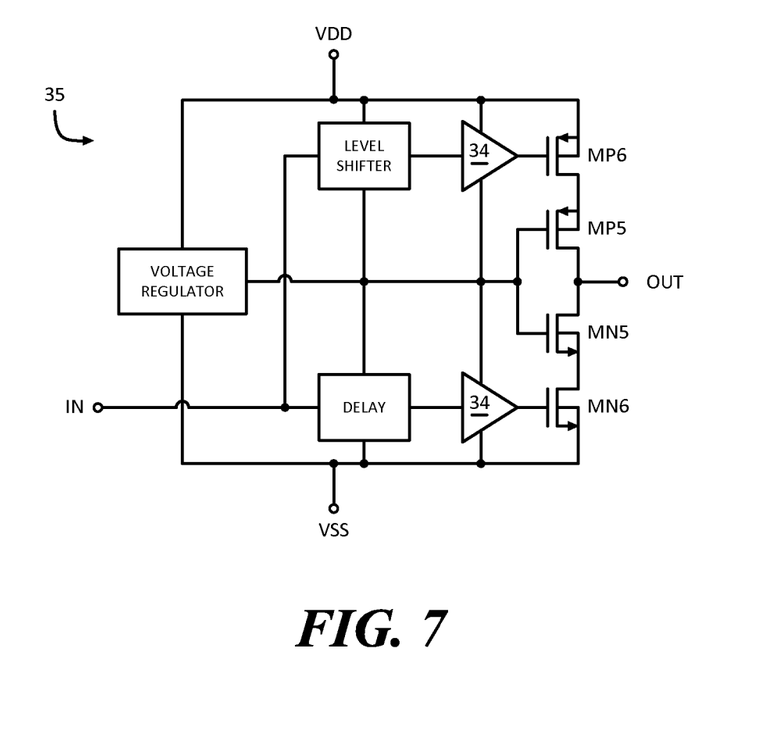
FIG. 7 is a schematic of a cascoded gate driver.

FIGS. 6-7 illustrate two alternative designs of the gate driving circuits. Both of which can be used for the high-voltage gate driver circuits 35 and the low-voltage gate driver circuits 34. However, as will be made clear in the following description, the gate driver in FIG. 6 is more suitable for the low-voltage gate driver 34 while the gate driver in FIG. 7 is more suitable for the high-voltage gate driver 35.

As illustrated in FIG. 6, a tapered gate driver features an input terminal IN, an output terminal OUT, and supply terminals VDD, VSS. The input terminal IN couples with the output terminal OUT through first, second, third, and fourth inverters, in that order. The four inverters include high-side PMOS transistors MP1-MP4 and low-side NMOS transistors MN1-MN4. Due to the difference in electron and hole mobilities, each of the PMOS transistors MP1-MP4 is typically sized larger than their corresponding NMOS transistors MN1-MN4.

Starting at the input terminal IN, each subsequent inverter is k times larger than the previous inverter. For example, if k is equal to five and the width of the first inverter is one micron, then the width of the second, third, and fourth inverters is five microns, twenty-five microns, and one hundred and twenty-five microns, respectively. By tapering the inverters, a small logic gate coupled to the input terminal IN is able to drive a large power transistor coupled to the output terminal OUT.

The maximum supply voltage of the tapered gate driver is equal to or less than the breakdown voltage of the transistors. Therefore, the tapered gate driver is a good choice for the low-voltage gate driver circuits 34 in the cascade multiplier circuit 30. Unfortunately, due to the higher voltage requirements of the high-voltage gate driver circuit 35 in FIGS. 3-5, the tapered gate driver circuit requires transistors with twice the breakdown voltage.

An alternative method of increasing the supply voltage without the need of higher voltage transistors is to use a cascoded gate driver. As illustrated in FIG. 7, a cascoded gate driver includes an input terminal IN, an output terminal OUT, and supply terminals VDD, VSS. The cascoded gate driver features an output stage that includes first and second high-side transistors MP5, MP6 and first and second low-side transistors MN5, MN6. The output stage requires additional support circuitry, such as a level shifter, two gate drivers, a delay block, and a voltage regulator, all of which can be designed using transistors with the same breakdown voltage as that of the transistors in the output stage.

During normal operation of the cascoded gate driver, the high-side transistors MP5, MP6 are activated when the low-side transistors MN5, MN6 are de-activated and vice-versa. Therefore, the cascoded gate driver can support twice the supply voltage because the differential voltage across the supply terminals VDD, VSS is always supported by two de-activated transistors. In general, a larger number of transistors can be cascoded to increase the supply voltage further. For example, if the output stage included three high-side transistors and three low-side transistors then the maximum supply voltage would be tripled and so on. Unfortunately, as the number of cascoded transistors increases, so does the complexity of the support circuitry.

3. Dual-Phase Cascade Multiplier

Figure 8:
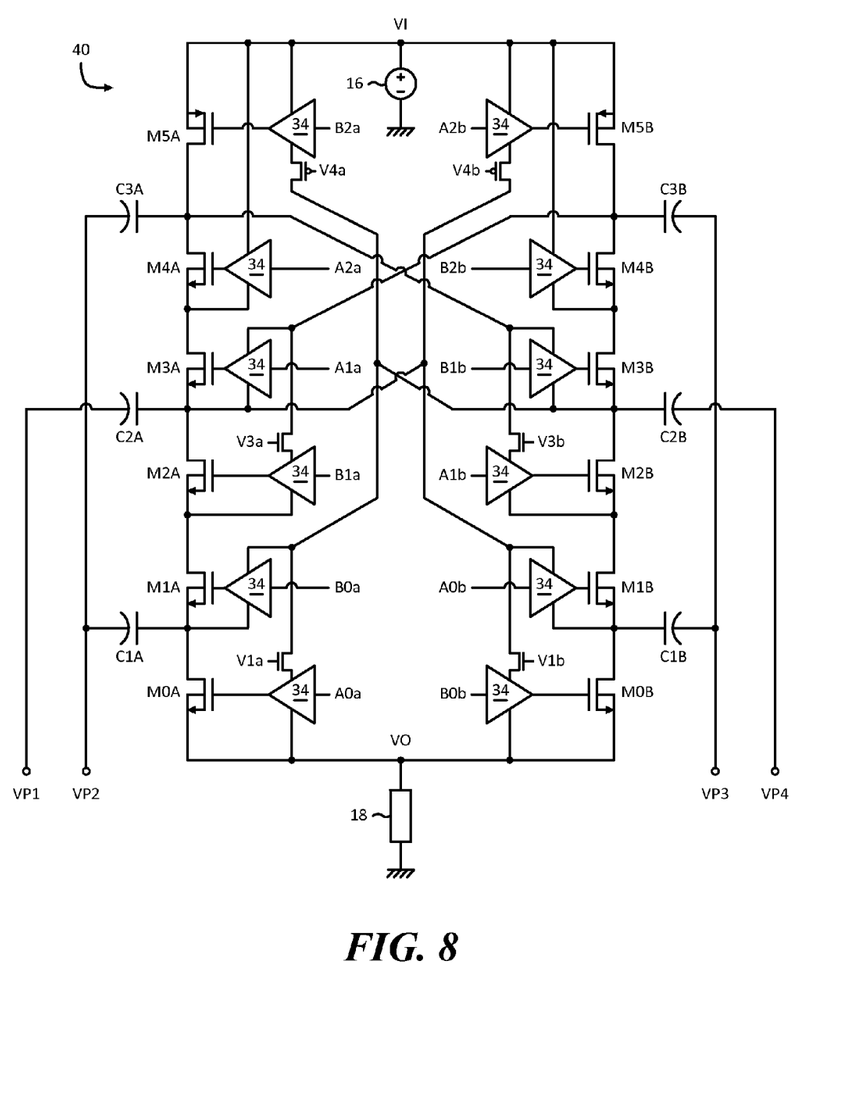
FIG. 8 is a schematic of a dual-phase cascade multiplier with cascoded switches and corresponding gate drivers.

In general, a single-phase cascade multiplier can be converted into a multi-phase cascade multiplier featuring multiple charge transfer paths that are shifted in time. As illustrated in FIG. 8, a dual-phase cascade multiplier circuit 40 can be constructed by placing two copies, of the single-phase cascade multiplier circuit 30 in parallel. Each copy is referred to as a phase (not to be confused with state), therefore, the cascade multiplier circuit 30 features a first phase and a second phase. The first phase includes capacitors C1A-C3A, transistors M0A-M5A, and phase voltages VP1, VP2 while the second phase includes capacitors C1B-C3B, transistors M0B-M5B, and phase voltages VP3, VP4. Each of the transistors M0A-M5B has a corresponding gate driver circuit 34 that receives a driver signal with a label either beginning with an "A" or a "B". The first phase includes driver signals A0a-B2a while the second phase includes driver signals A0b-B2b.

The control signals of the first phase and the second phase are shifted by one-hundred and eighty degrees. This can be achieved by swapping the "A" and "B" signals in one of the two phases and then inverting the corresponding phase voltages. For example, in normal operation, the phase voltages VP1, VP3 are high when the phase voltages VP2, VP4 are low and vice versa. Furthermore, the voltage followers in the first phase receive bias voltages V1a-V4a while the voltage followers in the second phase receive bias voltage V1b-V4b. As in the previous single-phase example, a control circuit (not shown in FIG. 8) can generate the drivers signals A0a-B2b and the bias voltages V1a-V4b.

Additionally, by having the source 16 and the load 18 trade places, a step-down power converter can be converted into a step-up converter and vice versa. Therefore, the cascade multiplier circuit 40 is step-down power converter instead of a step-up power converter as in FIG. 3.

There are several benefits of a dual-phase construction over a single-phase construction. The most obvious benefit is that there is always a charge transfer path between the source 16 and the load 18 regardless of the state of operation (first or second). A less obvious benefit is that the one phase can derive energy from an alternate phase to power circuitry and vice versa. Furthermore, this technique allows the cascade multiplier circuit 40 to only use low-voltage gate driver circuits 34.

Since a dual-phase converter is essentially two single-phase converters operated in parallel, the cascade multiplier circuit 40 operates as described in connection with FIGS. 3-5. Assuming the input voltage VI is twenty volts, the resulting voltage levels powering the gate driving circuits can be understood with reference to FIG. 9 that show one state of operation. The other state of operation is not shown because it is simply a mirror image of the state shown in FIG. 9.

Figure 9:
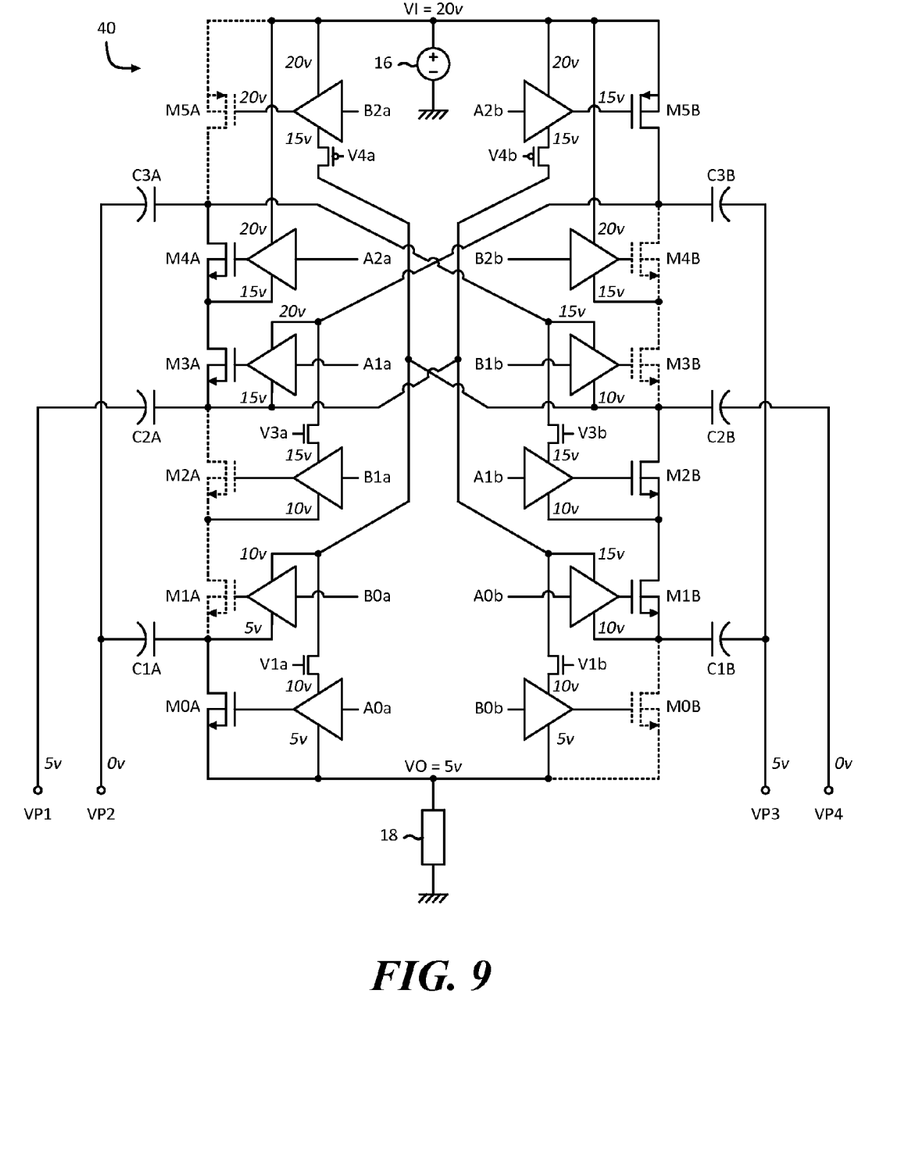
FIG. 9 is an annotated schematic of the circuit of FIG. 8 in one of two phases of operation.

In the cascade multiplier circuit 40, the transistors M0A-M3B derive power from opposing phases while the transistors M4A-M5B derive power from the input voltage VI. Powering the gate drivers from a parallel charge transfer path (i.e. opposing phase) results in one less voltage follower per phase and the voltage followers do not consume power. This is because the transistors M0A, M2A, M5A, M0B, M2B, M5B are de-activated while voltage is being dropped across their corresponding voltage followers. Because of the more efficient voltage followers and the lack of high-voltage gate driver circuits 35, the energy required to drive the gates in a dual-phase design is less than a single-phase design.

As in the single-phase construction of FIG. 3, it takes two full clock cycles for the initial charge into the cascade multiplier circuit 40 to reach the load 18. However, in the dual-phase construction, there are two charge transfer paths between the source 16 and the load 18, instead of one, as in the single-phase construction. Furthermore, the two distinct charge transfer paths are shifted in time with respect to each other.

For example, a first unit of charge from the source 16 enters a first charge transfer path at the input of the cascade multiplier circuit 40. During each state transition, the first unit of charge hops between the positive terminals of the capacitors C3B, C2B, C1B, in that order, thereby being delivered to the load 18 after four state transitions. Similarly, in a second charge transfer path, a second unit of charge leaves the source 16 and then precedes to hop between the positive terminals of the capacitors C3B, C2B, C1B each state transition. After the fourth state transition, the second unit of charge is delivered to the load 18. By shifting the first and second charge transfer paths one hundred and eighty out of phase, a path for charge always exists between the source 16 and the load 18.

Figure 10:
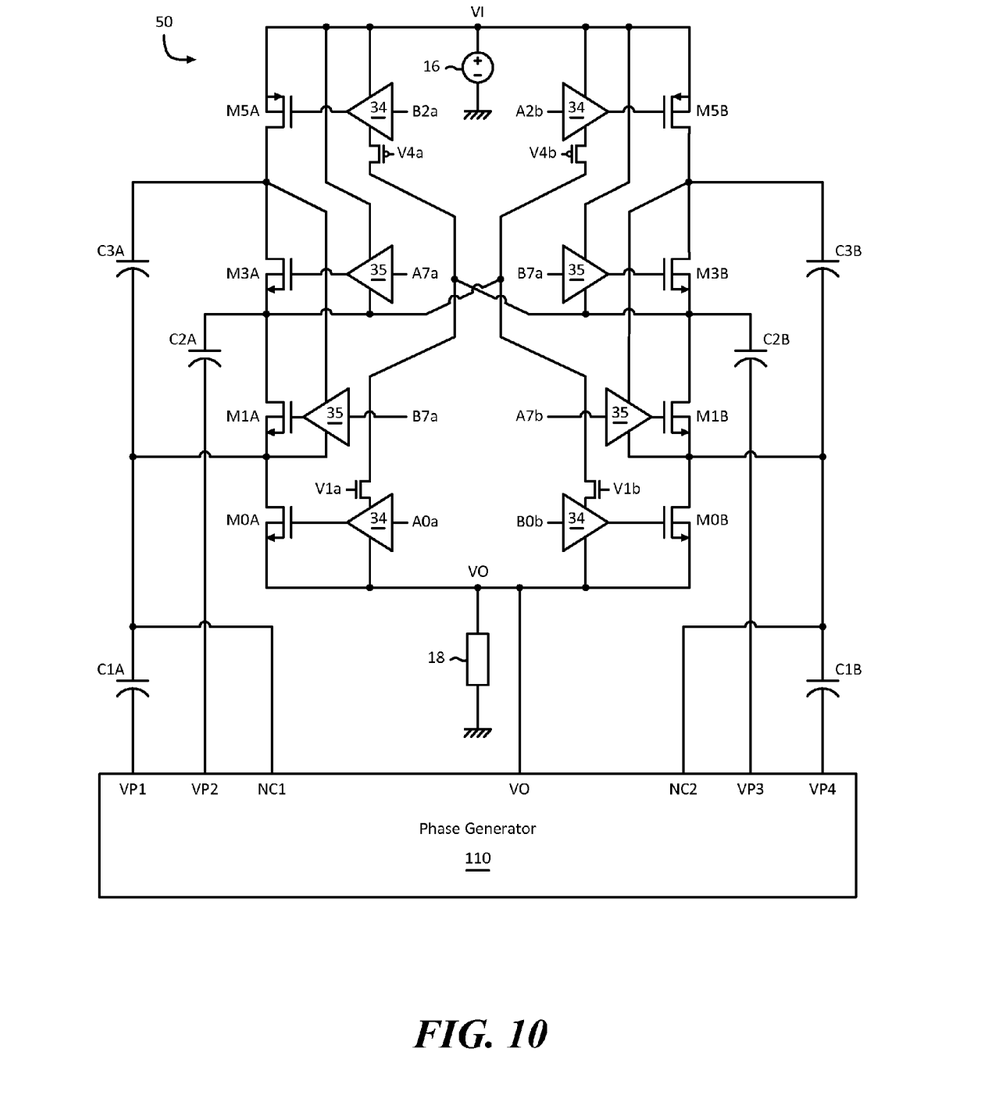
FIG. 10 is a schematic of a dual-phase cascade multiplier and corresponding gate drivers.

It should be appreciated that the above described dual-phase cascade multiplier circuit 40 is one of many different implementations. FIG. 10 illustrates an alternative dual-phase cascade multiplier circuit 50, formed by removing the cascode switches M2A, M4A, M2B, M4B in the cascade multiplier circuit 40, thereby reducing control complexity and perhaps improving robustness. Unfortunately, without the cascode switches, all of the inner switches M1A, M3A, M1B, M3B need to support twice the output voltage VO as well as their corresponding gate drivers 35.

Additionally, the pump capacitors C3A, C3B in the cascade multiplier circuit 50 are pumped in series with their corresponding pump capacitors C1A, C1B, compared to being pumped in parallel as in the cascade multiplier circuit 40. The series arrangement reduces the voltage across the pump capacitors C3A, C3B. For example, if the output voltage VO is five volts, then the voltage across the capacitors C3A, C3B is ten volts in FIG. 10 compared to fifteen volts in FIG. 8. Due to the similarity between the cascade multiplier circuits 40, 50, the cascade multiplier circuit 50 operates as described in connection with FIG. 10

4. Phase Generation

In addition to efficient generation of gate driving signals, the capacitor voltages can also be used to efficiently drive the phase signals that drive the capacitors. Two examples of the phase generator 110 are shown in FIGS. 11-12, suitable to use with the dual-phase cascade multiplier circuit 50 shown in FIG. 10.

Figure 11:
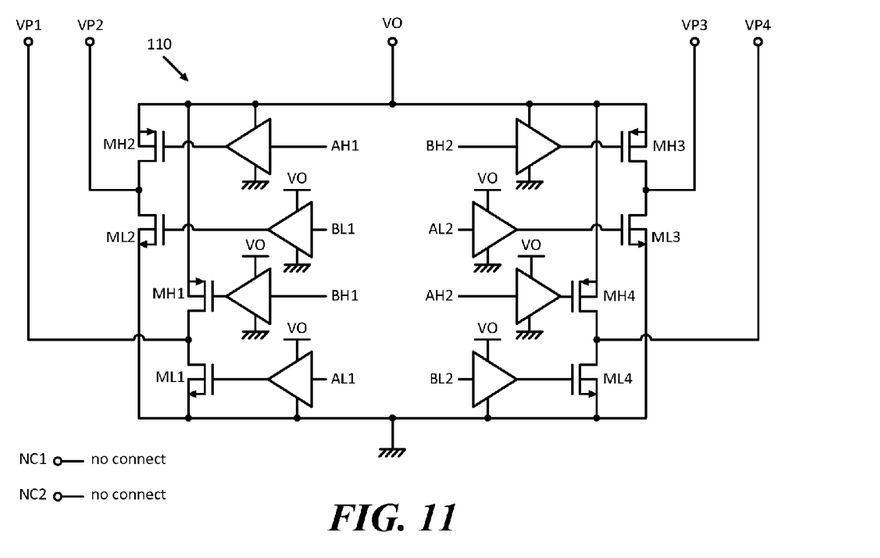
FIGS. 11-12 are schematics of two alternative phase generators for use with the circuit of FIG. 10.
Figure 12:
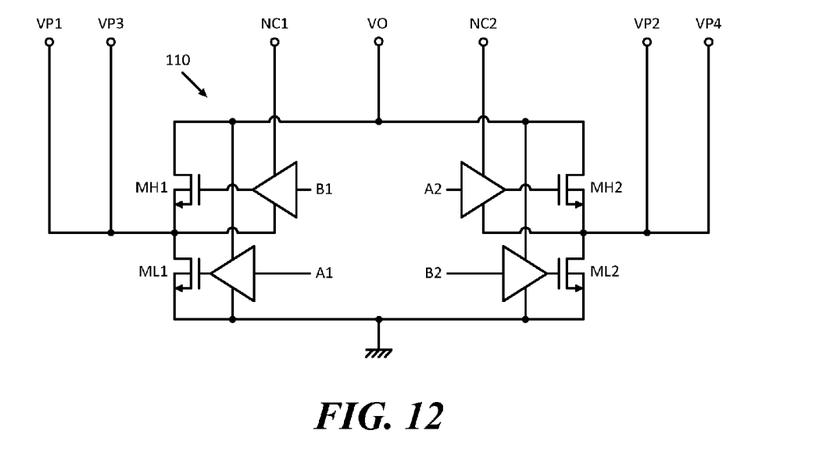

FIG. 11 illustrates a phase generator 110 that receives an output voltage VO and produces first, second, third, and fourth phase voltages VP1-VP4. The first and second phase voltages VP1, VP2 correspond to the first phase of the cascade multiplier circuit 50 while the third and fourth phase voltages VP3, VP4 correspond to the second phase of the cascade multiplier circuit 50.

The phase generator 110 features four transistor pairs, wherein each transistor pair generates one of the phase voltages VP1-VP4. A first pair of transistors MH1, ML1 generates the first phase voltage VP1; a second pair of transistors MH2, ML2 generates the second phase voltage VP2; a third pair of transistors MH3, ML3 generates the third phase voltage VP3; and a fourth pair of transistors MH4, ML4 generates the fourth phase voltage VP4. In each transistor pair, the high-side transistor (e.g. MH1) is a PMOS device while the low-side transistor (e.g. ML1) is a NMOS device.

Separate gate driver circuits control each transistor in the phase generator 110, thereby allowing tri-state operation of each transistor pair. The output voltage VO powers each gate driver circuit. The gate driver circuits can be implemented using numerous circuit topologies, such as the tapered gate driver illustrated in FIG. 6. Each gate driver circuit receives a driver signal with a label beginning with either an "A" or a "B". The driver signals AL1, BL1, AL2, BL2 control low-side transistors ML1, ML2, ML3, ML4, respectively while the driver signals BH1, AH1, BH2, AH2 control high-side transistors MH1, MH2, MH3, MH4, respectively.

In normal operation, the phase generator 110 cycles between a first state and a second state at a specific frequency. During the first state, the gate driver circuits that receive a "B" signal activate their corresponding transistors and the gate driver circuits that receive an "A" signal de-activate their corresponding transistors. Consequently, the first and third phase voltages VP1, VP3 are equal to the output voltage VO while the second and fourth phase voltages VP2, VP4 are equal to zero volts.

In contrast, during the second state, the gate driver circuits that receive a "B" signal de-activate their corresponding transistors and the gate driver circuits that receive an "A" signal activate their corresponding transistors. Consequently, the first and third phase voltages VP1, VP3 are equal to zero volts while the second and fourth phase voltages VP2, VP4 are equal to the output voltage VO.

FIG. 12 illustrates an alternative phase generator 110 that receives an output voltage VO and produces first, second, third, and fourth phase voltages VP1-VP4. In a dual-phase design, the first and third phase voltages VP1, VP3 are in phase; and the second and fourth phase voltages VP2, VP2 are in phase. Consequently, as illustrated in FIG. 12, the first and third phase voltages VP1, VP3 can be shorted together and the second and fourth phase voltages VP2, VP4 can be shorted together.

Additionally, high-side transistors MH1, MH2 can utilize NMOS transistors instead of PMOS transistors as in FIG. 11. The higher mobility of electrons in NMOS transistors allows for the use of smaller high-side transistors MH1, MH2, thereby reducing the energy required to activate. Because NMOS transistors require a gate voltage higher than their source to activate, the high-side transistors MH1, MH2 derive this boost voltage from the pump capacitors within the cascade multiplier that the phase generator 110 is driving.

For example, if the phase generator 110 is coupled to the cascade multiplier circuit 50, then the gate driver of the high-side transistor MH1 is coupled to the positive terminal of the pump capacitor C1A from phase one. In contrast, the gate driver of the high-side transistor MH2 is coupled to the positive terminal of the pump capacitor C1B from phase two. Therefore, each gate driver and its corresponding high-side transistor is powered by a pump capacitor from a distinct parallel charge transfer path.

Because of the similarity of the phase generators 110 in FIGS. 11-12, the operation of the phase generator 110 in FIG. 12 operates as described in connection with FIG. 11. The differences mainly being the shorted phase voltages and boosted high-side transistors MH1, MH2.

5. Alternatives

Figure 13:
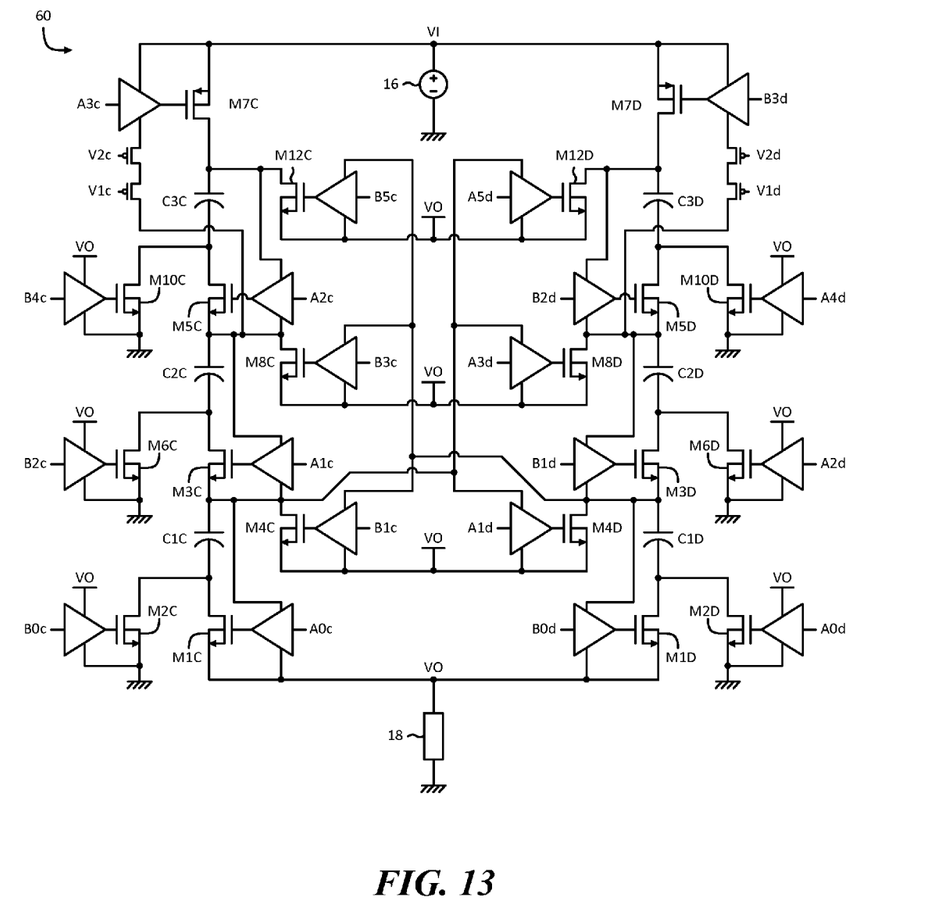
FIG. 13 is a schematic of a dual-phase series-parallel switched capacitor converter and corresponding gate drivers.

A number of alternatives to the switched capacitor power converter designs discussed make use of the approaches embodied in those designs. For example, the converter illustrated in FIG. 13 is a dual-phase series-parallel switched capacitor circuit 60 that includes some gate drivers that are powered by capacitors in either the same charge transfer path or a parallel charge transfer path.

The switched capacitor circuit 60 includes a pair of phases. A first phase includes capacitors C1C-C3C, odd transistors M1C-M7C, and even transistors M2C-M12C. Similarly, a second phase includes capacitors CM-C3D, odd transistors M1D-M7D, and even transistors M2D-M12D. All of the transistors coupled with signals having an "A" prefix through corresponding gate drivers are activated and de-activated at the same time; as is the case for all of the transistors coupled with signals having a "B" prefix through corresponding gate drivers.

The switched capacitor circuit 60 produces an output voltage VO that is four times lower than an input voltage VI by cycling between a first state and a second state at a specific frequency. During the first state, the first phase odd transistors M1C-M7C and the second phase even transistors M2D-M12D are activated while the first phase even transistors M2C-M12C and the second phase odd transistors M1D-M7D are de-activated. This switch activation pattern places the second phase capacitors C1D-C3D in parallel with the load 18 and places a series arrangement of the first phase capacitors C1C-C3C in between the source 16 and the load 18.

In contrast, during the second state, the first phase odd transistors M1C-M7C and the second phase even transistors M2D-M12D are de-activated while the first phase even transistors M2C-M12C and the second phase odd transistors M1D-M7D are activated. This switch activation pattern places the first phase capacitors C1C-C3C in parallel with the load 18 and places a series arrangement of the second phase capacitors C1D-C3D in between the source 16 and the load 18.

Unlike either of the dual-phase cascade multiplier circuits 40 or 50, within a single phase of the switched capacitor circuit 60, the gate drivers derive their power from capacitors in both phases. For example, the gate drivers for the corresponding transistors M1C, M3C, M5C are powered from the capacitors C1C, C2C, C3C, respectively while the gate drivers for the corresponding transistors M4C, M8C, M12C are powered from the capacitor C1D.

Furthermore, the voltage stress across the transistors in a series-parallel switched capacitor power converter can be quite high in comparison to cascade multipliers. Assuming the input voltage VI is equal to twenty volts then the maximum voltage across the transistors M12C, M12D is fifteen volts. In this embodiment, the gate-to-source voltage is always five volts and the gate drivers for the top PMOS transistors require two series connected voltage followers that are biased using voltages $V1c$-$V2d$.

Although described in the context of single-phase and dual-phase converters, it should be understood that other multi-phase converter configurations can be used. For example, a four-phase cascade multiplier can be constructed by placing two copies of the cascade multiplier circuit 40 in parallel and shifting their respective clocks by ninety degrees. Adding an even number of phases is straightforward because every subsequent pair of phases can be run in isolation.

However, if the switched capacitor power converter includes an odd number of phases, it is a little more difficult to power gate drivers from capacitors in different parallel charge transfer paths. In this case, each gate driver draws power from capacitors in multiple parallel charge transfer paths, as compared to a single parallel charge transfer path in the even-numbered phase case.

In general, switched capacitor converters feature a large number of switches and capacitors. By necessity, at least a few of the switches are floating, which means that neither switch terminal is attached to a constant electric potential. It should be appreciated that switched capacitor converters that have at least one floating switch can benefit by deriving power from the same charge transfer path or a parallel charge transfer path. Examples of such switched capacitor converters include the cascade multiplier, series-parallel, parallel-series, Fibonacci, and voltage doubler topologies.

6. Implementations

The switched capacitor power converters and the associated gate drivers illustrated herein can all be integrated on one or multiple semiconductor substrates. If all of the transistors are integrated on a single substrate and any of the transistors are floating then the transistors must be isolated from the substrate. For example, in a CMOS process, NMOS transistors are typically formed in a p-type substrate. These devices can only float if the bulk of the NMOS transistors is isolated from the substrate. If this were not the case, then an alternative possibility would be to use multiple semiconductor substrates.

The capacitors in a switched capacitor power converter can either be integrated, discrete, or a combination thereof. The discrete capacitors are typically multi-layer ceramic capacitors while the integrated capacitors are typically planar or trench capacitors. If the capacitors are integrated, then they can be integrated on the same wafer with their switches, or they can be integrated on a separate wafer, or a combination thereof. Furthermore, if the capacitors and switches are on different wafers then there are various attachment methods, some of which remove the pin count limitation of the overall converter.

The ability to re-purpose the pump capacitors is of benefit when the switched capacitor power converter uses either integrated capacitors or discrete capacitors. If discrete capacitors are used, then each capacitor uses at least one pin. Adding extra pins for the gate driver circuitry is quite painful because pins on an integrated circuit are of limited supply for a given die area. On the other hand, integrated capacitors do not eat into your pin count, but they are quite expensive and have a low capacitance per area so it is valuable to limit their use.

Typically, a controller produces control signals for activating and de-activating the switches within a switched capacitor power converter. For example, in most of the embodiments described above, a controller could have generated the driver signals that are labeled with an "A" or a "B" prefix. By controlling the on and off time of the individual switches, a controller can provide many functions. A few such functions include the ability to regulate the output voltage, the ability to shut off the power converter in the event of a fault condition, and the ability to change the gain of the switched capacitor network.

Various features, aspects, and embodiments of switched capacitor power converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expressions which have been employed herein are used as terms of description and not of limitation. There is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

It is to be understood that the foregoing description is intended to illustrate and not to limit the scope of the invention, which is defined by the scope of the appended claims. Other embodiments are within the scope of the following claims.

What is claimed is:

1. A switched capacitor power converter comprising a first terminal for coupling to a first external circuit at substantially a high voltage, a second terminal for coupling to a second external circuit at substantially a low voltage that is less than said high voltage in magnitude, a first plurality of active semiconductor switch elements configured to transition between first and second states that result in corresponding first and second electrical interconnections between capacitors and at least one of said first and second terminals, wherein, in said first state, first and second switch elements from said plurality of switch elements, when closed, define a DC current path between said first and second switch elements and connect at least some of said capacitors to one another, a plurality of switch-driving circuits, each switch element coupled to and for control by a drive output of one of said switch-driving circuits each switch-driving circuit having a control input, power connections, and a drive output coupled to and for control of one or more of said switch elements, wherein at least some switch-driving circuits are configured to be powered via said power connections of said switch-driving circuits from one or more of said capacitors such that a voltage across said power connections of said switch-driving circuit is substantially less than said high voltage.

2. The switched capacitor power converter of claim 1, further comprising a plurality of capacitors coupled to said first plurality of switch elements controllably coupled via said switch elements.

3. The switched capacitor power converter of claim 1, further comprising a plurality of terminals coupled to said first plurality of switch elements for connecting to said capacitors.

4. The switched capacitor power converter of claim 1, wherein said converter is configured to provide time varying voltages relative to said low voltage to at least some of said switch-driving circuits.

5. The switched capacitor power converter of claim 1, wherein each switch element has a maximum voltage rating that is less than said high voltage.

6. The switched capacitor power converter of claim 5, wherein said voltage across said power connections of said switch-driving circuit is configured to be driven from said capacitors with less than or substantially equal to two times said low voltage.

7. The switched capacitor power converter of claim 1, wherein each switch element in said series of multiple ones of said switch elements is driven by a corresponding switch-driving circuit, each of said switch-driving circuits being configured to be powered via said power connections of said switch-driving circuits from different capacitors of said plurality of capacitors that in operation have different voltages.

8. The apparatus of claim 1, wherein said switch elements are configured to permit conduction current to flow between said capacitors to one another through a series of multiple ones of said switch elements.

9. The apparatus of claim 1, wherein each capacitor in said at least some capacitors comprises a first terminal and a second terminal, wherein said first terminal is at a higher voltage than said second terminal, wherein said at least some capacitors comprise a first capacitor and a second capacitor, and wherein said multiple ones of said switch elements connect a first terminal of said first capacitor to a first terminal of said second capacitor.

10. The apparatus of claim 9, wherein said second terminal of said first capacitor is connected to a first phase voltage, wherein said second terminal of said second capacitor is connected to a second phase voltage, and wherein said first phase voltage is different from said second phase voltage.

11. The apparatus of claim 1, wherein said multiple ones of said switch elements connect higher voltage terminals of capacitors to each other.

12. The apparatus of claim 1, further comprising a pre-charge circuit connected to at least some of said capacitors.

13. An apparatus for converting voltage, said apparatus comprising first and second terminals and a switching network, said switching network comprising switch-driving circuits, and switch elements, wherein said first and second terminals are configured for coupling to corresponding first and second external circuits at corresponding first and second voltages, wherein said switch elements electrically interconnect capacitors to form a switched-capacitor network, wherein said switch elements electrically interconnect said capacitors in successive states to one another and to said terminals, wherein a first successive state is associated with a first switch-activation pattern and a second successive state is associated with a second switch-activation pattern, wherein in said first switch-activation pattern, all switches in a first subset of said switch elements are closed and all switches in a second subset of said switch elements are open, wherein in said second switch-activation pattern, all switches in said second subset of said switch elements are closed and all switches in said first subset of said switch elements are open, wherein said switch elements comprise first and second switch elements that are in series and in said first subset, wherein each switch-driving circuit comprises power connections, a control input, and a drive output coupled to and for control of one of said switch elements, wherein said switch-driving circuits comprise a first switch-driving circuit that is configured to be powered via corresponding first and second power connections, wherein said first power connection is coupled to one of said capacitors such that a voltage difference between said first and second power connections is less than a highest of said first and second voltages, and wherein said first and second terminals and said switching network are constituents of a switched-capacitor converter.

14. The apparatus of claim 13, wherein, when said switch elements are configured according to said first switch-activation pattern, said first and second switch elements interconnect some of said capacitors to one another.

15. The apparatus of claim 13, wherein said switched-capacitor converter is configured to provide, to said switch-driving circuits, time-varying voltages relative to a lowest of said corresponding voltages.

16. The apparatus of claim 13, wherein each switch element has a maximum voltage rating that is less than a particular voltage, wherein said particular voltage is a highest of said first and second voltages.

17. The apparatus of claim 13, wherein a voltage across said first and second power connections of said switch-driving circuit is less than or equal to a particular voltage, wherein said particular voltage is twice the lowest of said first and second voltages.

18. An apparatus for converting voltage, said apparatus comprising terminals and a switching network, said switching network comprising switch-driving circuits and switch elements, wherein said terminals are configured for coupling to corresponding external circuits at corresponding voltages, wherein said switch elements comprise active semiconducting-elements that electrically interconnect capacitors to form a switched-capacitor network that is configured to transition between successive states, wherein said switch elements electrically interconnect said capacitors in said successive states to one another and to said terminals, thereby defining a plurality of charge-transfer paths, each of which extends between said terminals, for facilitating charge transfer therebetween, wherein each switch-driving circuit comprises a drive output, power connections, and a control input, wherein each drive output is coupled to and controls one of said switch elements, wherein said plurality of charge transfer paths comprises a first charge transfer path and a second charge transfer path, wherein said switch-driving circuits comprise a first switch-driving circuit that controls a switch element that is a constituent element of said first charge-transfer path, wherein said first switch-driving circuit is powered via said power connections thereof by charge stored on a capacitor that is a constituent element of said second charge-transfer path, and wherein said terminals and said switching network are constituents of a switched-capacitor converter.

19. The apparatus of claim 18, wherein said switch-driving circuits comprise a first switch-driving circuit, wherein said first switch-driving circuit is configured to be powered via power connections thereof from charge stored in a capacitor set such that a voltage across said power connections is substantially less than a particular voltage, wherein said particular voltage is a highest of said corresponding voltages.

20. The apparatus of claim 18, further comprising capacitors coupled to said switch elements, wherein connections between said capacitors are controlled by said switch elements.

21. The apparatus of claim 18, wherein said terminals comprise capacitor terminals coupled to corresponding ones of said switch elements for connecting to said capacitors.

22. The apparatus of claim 18, wherein said switched-capacitor converter is configured to provide, to at least some of said switch-driving circuits, time-varying voltages relative to a lowest of said corresponding voltages.

23. The apparatus of claim 18, wherein each switch element has a maximum voltage rating that is less than a highest of said corresponding voltages.

24. The apparatus of claim 23, wherein said switch-driving circuits comprise a first switch-driving circuit, wherein said first switch-driving circuit comprises first and second power connections, wherein, in operation, a voltage difference exists across said first and second power connections, wherein said voltage difference arises at least in part from a capacitor that is connected to said first power connection, wherein said voltage difference is less than or equal to a particular voltage, wherein said particular voltage is less than or substantially equal to twice a lowest of said corresponding voltages.

25. The apparatus of claim 18, wherein said switch-driving circuits comprise a first switch-driving circuit and a second switch-driving circuit, wherein said switch elements comprise a first switch-element and a second switch-element, wherein said first switch-element is driven by said first switch-driving circuit, wherein said first switch-driving circuit is configured to be powered by a first capacitor that has a first voltage, wherein said second switch-element is driven by said second switch-driving circuit, wherein said second switch-driving circuit is configured to be powered by a second capacitor that has a second voltage, and wherein said first voltage is different from said second voltage.

26. The apparatus of claim 18, further comprising a phase generator, wherein said phase generator comprises phase-generator switch elements, wherein said phase generator is configured to provide a time-varying voltage level to one terminal of each of said capacitors, wherein said phase generator is configured to generate a voltage level for a capacitor in said first charge-transfer path using a voltage from a capacitor in said second charge-transfer path.

27. The apparatus of claim 18, wherein said switch elements comprise a first switch element and a second switch element, wherein said second switch element is in series with said first switch element, wherein, in operation, said first and second switches transition into a state in which said first and second switch elements permit a steady flow of charge between capacitors.

28. The apparatus of claim 18, wherein each switch element has a maximum voltage rating that is less than a highest of said corresponding voltages.

29. The apparatus of claim 18, wherein said switched-capacitor converter comprises a cascade-multiplier network.

30. The apparatus of claim 18, wherein said switched-capacitor converter comprises a series-parallel switched-capacitor network.

31. The apparatus of claim 18, further comprising a pre-charge circuit connected to said switched-capacitor network.

32. The apparatus of claim 31, wherein said pre-charging circuit is configured to initialize voltages on capacitors in said switched-capacitor network prior to clocked operation of said switched-capacitor network.

33. A method for converting a first voltage into a second voltage, said method comprising connecting a first terminal of a switched-capacitor power converter to a first external circuit, said switched-capacitor power converter comprising a switched-capacitor network in which capacitors are selectively interconnected by active semiconductor-switches, connecting a second terminal of said switched-capacitor power converter to a second external circuit, providing first control-signals to control inputs of switch-driving circuitry of said power converter, wherein said first control-signals cause first drive-signals at corresponding drive-outputs of said switch-driving circuitry, wherein said first drive-signals cause said active semiconductor-switches to execute a first switch-activation pattern, providing second control-signals to control inputs of said switch-driving circuitry, wherein said second control-signals cause second drive-signals at corresponding drive-outputs of said switch-driving circuitry, wherein said second drive-signals cause said active semiconductor-switches to execute a second switch-activation pattern, and providing power to said switch-driving circuitry through power connections thereof, said power being provided by capacitors from said switched-capacitor network, wherein, in said first switch-activation pattern, a first series of active semiconductor-switches connect first and second capacitors in said switched-capacitor network of said power converter so as to permit conduction current to flow between high-voltage terminals of first and second capacitors, wherein providing said power comprises causing a voltage across said power connections to be less than a highest of said first and second voltages.

* * * * *